(No Model.) 2 Sheets—Sheet 1.

F. K. WARD.
MILK PRESERVING JAR AND SEALED STOPPLE FOR THE SAME.

No. 437,952. Patented Oct. 7, 1890.

Witnesses:
Edwin L. Bradford
Gideon L. Fooker

Inventor:
Frank K. Ward
By H. J. Ennis
Attorney.

(No Model.) 2 Sheets—Sheet 2.

F. K. WARD.
MILK PRESERVING JAR AND SEALED STOPPLE FOR THE SAME.

No. 437,952. Patented Oct. 7, 1890.

Witnesses:
Edwin L. Bradford
Gideon L. Fooker

Inventor:
Frank K. Ward
By H. F. Ennis
Attorney.

THE NORRIS PETERS CO., PHOTO-LITHO., WASHINGTON, D. C.

UNITED STATES PATENT OFFICE.

FRANK K. WARD, OF WASHINGTON, DISTRICT OF COLUMBIA.

MILK-PRESERVING JAR AND SEALED STOPPLE FOR THE SAME.

SPECIFICATION forming part of Letters Patent No. 437,952, dated October 7, 1890.

Application filed September 4, 1890. Serial No. 363,923. (No model.)

*To all whom it may concern:*

Be it known that I, FRANK K. WARD, a citizen of the United States, residing at Washington, in the District of Columbia, have invented a certain new and useful Sealed Milk-Jar; and I do hereby declare the following to be a full, clear, and exact description of the invention, such as will enable others skilled in the art to which it pertains to make and use the same, reference being had to the accompanying drawings, and to the letters of reference marked thereon, which form a part of this specification.

My invention relates to certain improvements in an hermetically-sealed jar or vessel which is especially designed for containing, preserving, and transporting milk and cream; and the novelty consists in the construction, combination, and arrangement of parts of the same, as will be hereinafter more fully described, and particularly pointed out in the claims.

Figure 1:
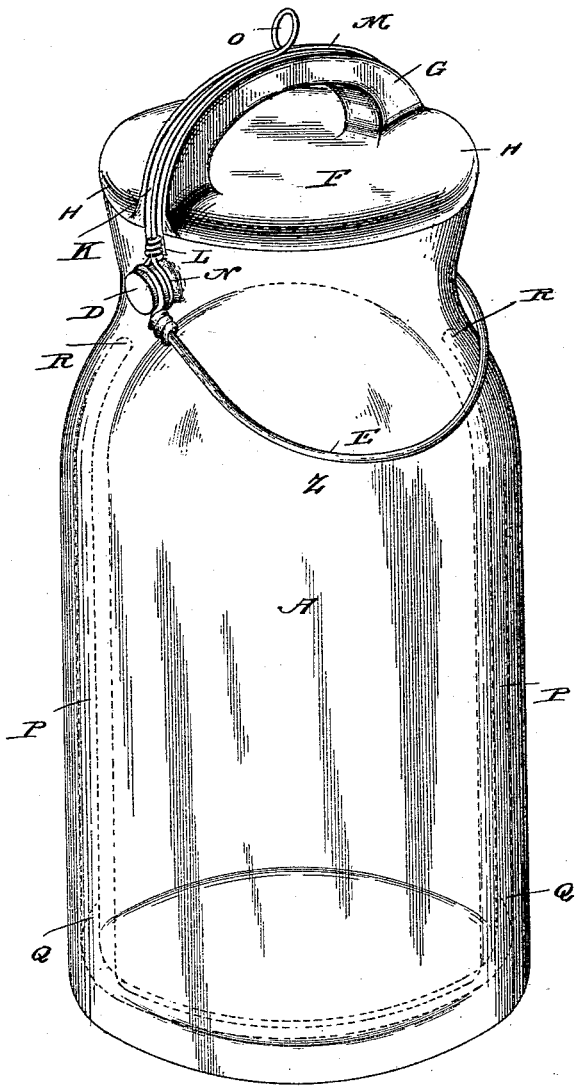
Figure 2:
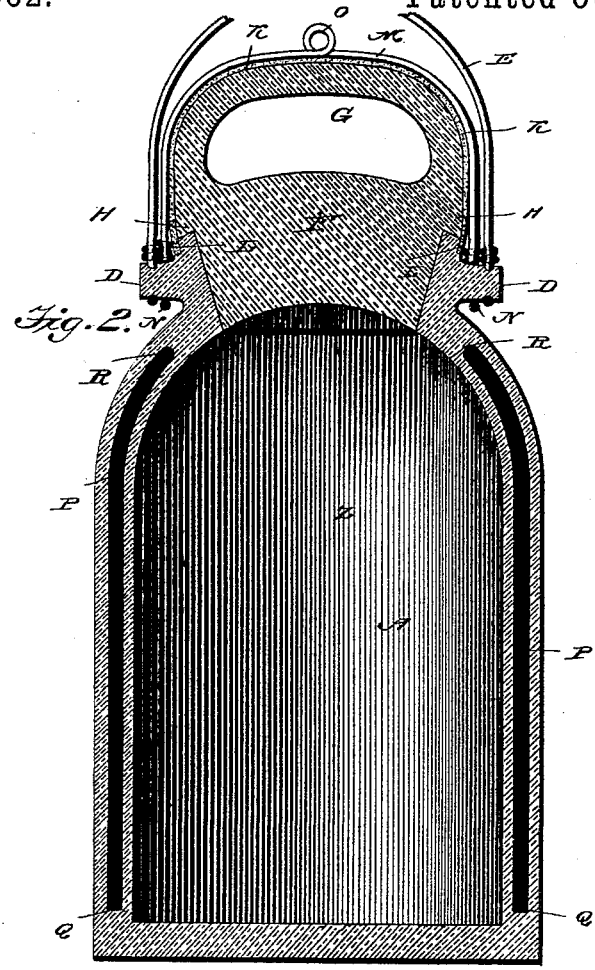
Figure 3:
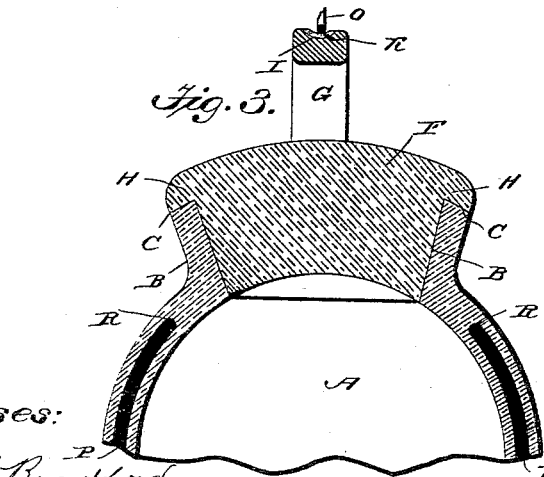

Figure 1 is a view in perspective of the jar complete. Fig. 2 is a diametrical section of the same, and Fig. 3 is a similar section taken on a plane at a right angle to Fig. 2.

Similar letters of reference indicate corresponding parts in all the figures.

Referring to the drawings by letter, A designates a jar or vessel, which may be made of any vitreous or other material, preferably of glass. It will be observed by reference to the drawings that the internal side of the upper portion of the jar is a segment of a sphere or a dome struck from the point $z$, and that the mouth B flares upwardly and outwardly, terminating in an outwardly-beveled surface C, and formed integral with the neck of the jar are lugs, eyes, or ears D D, adapted to have suitably attached to them a bail E.

F designates a stopple, which is made of a vitreous material, preferably of glass, and ground or otherwise fitted into the mouth of the jar, similar to what is technically known as a "salt-mouth stopple," with a handle G, with this exception that this stopple has an annular flange beveled outwardly and downwardly at H to conform snugly to the beveled edge C of the mouth of the jar.

By referring again to Figs. 2 and 3 of the annexed drawings it will be observed that when the stopple F is home its concave bottom coincides exactly with and practically forms a circular "key-stone" cap for the bottom of the body of the jar.

From the above description it will be seen that I do not leave any interior shoulder or abrupt edge which would be liable in the transportation or handling of a jar of milk or cream to churn the contents or in any manner allow them to escape from the jar.

The handle G is provided with a recess I, extending entirely over and around its top, so that an oblong label or seal K may be laid in said recess and the gummed edges of the label attached to the neck of the jar in recesses L L, registering with and forming a continuation of the recess I in the handle on each side of the stopple, to prevent the unauthorized or accidental removal of the stopple and act as a seal against tampering with the contents, and at the same time the recess I in the handle and the recesses L L in the neck prevent the lateral displacement of the seal or label.

M is a guard, consisting of a piece of spring-wire having loops N N, by means of which it is secured around and hinged to the lugs D D. This guard M is provided with a coil-ring O, which serves as a handle to manipulate said guard and at the same time allows it to spring longitudinally to facilitate its insertion in and removal from the recess I in the handle, and when in place holds the seal or label securely in position and at the same time prevents the displacement of the stopple.

P is an annular air-space extending from a point Q near the bottom of the jar to a point R in the neck and entirely around the jar, which space acts as a non-conductor of heat and in warm weather preserves the contents in a cooled condition during transportation, and in very cold weather prevents frost or low temperatures from freezing the contents and breaking the jar.

It will be observed that the contents of the jar can only come in contact with the glass jar itself and the glass stopple, no rubber, cork, or other packing of any kind being required. Consequently the contents are kept absolutely pure, there being no absorbent material which might come in contact with the milk and contaminate it.

Having thus described my invention, what I claim as new and useful, and desire to secure by Letters Patent, is—

1. A jar having a flaring mouth provided with a downwardly and outwardly beveled edge, in combination with a solid frustum-stopple provided with an overhanging lip beveled to correspond with the edge of the jar, as above specified.

2. The combination, with the jar having a globular top, a flaring mouth and downwardly-beveled edge, substantially as described, of a solid stopple provided with an annular downwardly-projecting edge or flange, a downwardly-converging body, and a concave bottom, as hereinabove set forth.

3. As a new article of manufacture, an integral glass jar having double peripheral walls forming an annular sealed air-space and a solid bottom, as above described.

4. The combination, with a jar, substantially as described, of a stopple provided with a handle having a label-receiving recess extending entirely around its upper portion, and an elastic guard M, seating in said recess to hold the label in place, as and for the purpose set forth.

5. The combination, with a jar provided with recesses L L, of a stopple provided with a handle G, having recess I, which when said stopple is in place registers with the recesses L L in the jar, thereby forming a seat for a sealing-label, as set forth.

6. The combination, with a jar provided with recesses L L, of a stopple provided with a handle G, having recess I, which when said stopple is in place registers with the recesses L L in the jar, thereby forming a seat for a sealing-label, and an elastic guard M, connected to the bottle and seating in said recess I to hold the label in place, as set forth.

FRANK K. WARD.

Witnesses:
H. J. ENNIS,
JOS. C. FOWLER.